US011134364B2

(12) United States Patent
Hu et al.

(10) Patent No.: US 11,134,364 B2
(45) Date of Patent: Sep. 28, 2021

(54) QUICK BURST TUNEAWAY

(71) Applicant: QUALCOMM Incorporated, San Diego, CA (US)

(72) Inventors: Jun Hu, San Diego, CA (US); Qingxin Chen, San Diego, CA (US); Reza Shahidi, San Diego, CA (US); Hemanth Kumar Rayapati, San Diego, CA (US); Scott Hoover, Del Mar, CA (US); Chhavi Jain, San Diego, CA (US); Subhash Simhambhatla, San Diego, CA (US); Padmanabhan Ramakrishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 16/688,897

(22) Filed: Nov. 19, 2019

(65) Prior Publication Data

US 2020/0169858 A1 May 28, 2020

Related U.S. Application Data

(60) Provisional application No. 62/771,527, filed on Nov. 26, 2018.

(51) Int. Cl.
*H04W 4/60* (2018.01)
*H04W 8/24* (2009.01)
(Continued)

(52) U.S. Cl.
CPC .............. *H04W 4/60* (2018.02); *H04W 8/24* (2013.01); *H04W 24/10* (2013.01); *H04W 56/001* (2013.01); *H04W 68/005* (2013.01)

(58) Field of Classification Search
CPC ......... H04W 4/60; H04W 8/24; H04W 24/10; H04W 56/001; H04W 68/005;
(Continued)

(56) References Cited

U.S. PATENT DOCUMENTS

2015/0257099 A1 9/2015 Su
2016/0050644 A1 2/2016 Anand et al.
(Continued)

OTHER PUBLICATIONS

Intel Corporation: "Further Discussion on Requirements in NR RRC_Idle", 3GPP Draft, 3GPP TSG-RAN WG4 Meeting #88, R4-1809809 NR Idle R10, 3rd Generation Partnership Project (3GPP), Mobile Competence Centre, 650, Route Des Lucioles, F-06921 Sophia-Antipolis Cedex, France, [Online], vol. RAN WG4, No. Gothenburg, SE, Aug. 20, 2018-Aug. 24, 2018, Aug. 10, 2018 (Aug. 10, 2018), 6 pages, XP051578847, Retrieved from the Internet: URL: http://www.3gpp.org/ftp/tsg%5Fran/WG4%5FRadio/TSGR4%5F88/Docs/R4%2D1809809%2Ezip> [retrieved on Aug. 10, 2018], p. 1-p. 4.

(Continued)

*Primary Examiner* — Chuong A Ngo
(74) *Attorney, Agent, or Firm* — Arent Fox LLP

(57) ABSTRACT

A method, a computer-readable medium, and an apparatus may be a User Equipment (UE) having a first subscription to a first RAT and a second subscription to a second RAT configured to operate using the first RAT, to change from operating using the first RAT to operating using the second RAT to monitor multiple Synchronization Signal Blocks (SSBs) at multiple times prior to performing at least one of decoding a paging message, receiving system information, searching a neighboring frequency, or measuring the neighboring frequency, to return to using the first RAT during a first period between at least one set of adjacent times of the multiple times that the UE monitors for the SSBs, and to change from using the first RAT to using the second RAT to (Continued)

receive the paging message, receive the system information, search the neighboring frequency, or measure the neighboring frequency.

29 Claims, 8 Drawing Sheets

(51) Int. Cl.
    *H04W 24/10*     (2009.01)
    *H04W 56/00*     (2009.01)
    *H04W 68/00*     (2009.01)

(58) Field of Classification Search
    CPC . H04W 48/16; H04W 48/18; H04W 36/0088; H04W 8/183; H04W 88/06; H04W 72/1215; H04W 60/005
    See application file for complete search history.

(56) References Cited

U.S. PATENT DOCUMENTS

| | | | |
|---|---|---|---|
| 2016/0255639 A1* | 9/2016 | Chen | H04W 72/02 370/336 |
| 2016/0381710 A1 | 12/2016 | Bansal et al. | |
| 2020/0022040 A1* | 1/2020 | Chen | H04W 56/001 |

OTHER PUBLICATIONS

International Search Report and Written Opinion—PCT/US2019/062532—ISAEPO—dated Apr. 15, 2020.

\* cited by examiner

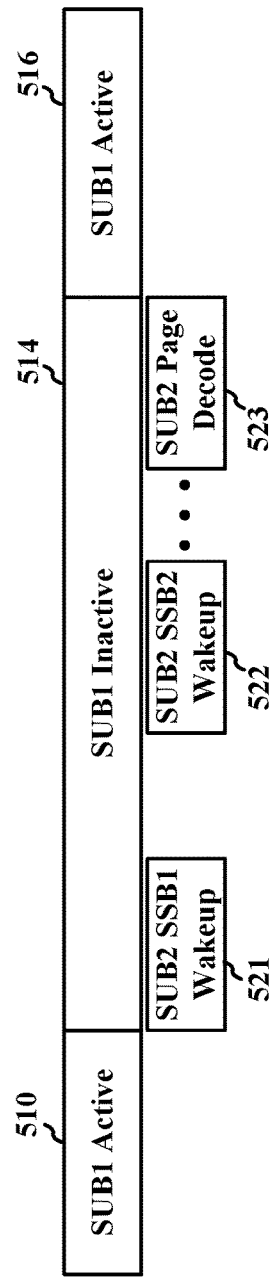
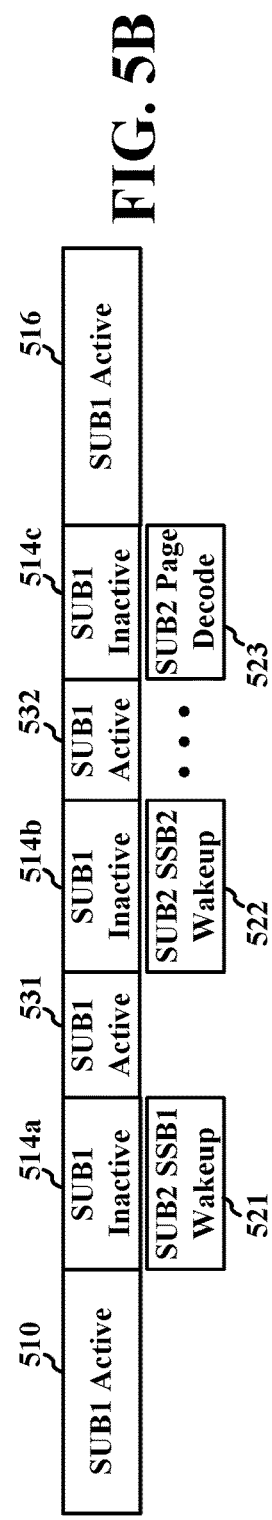
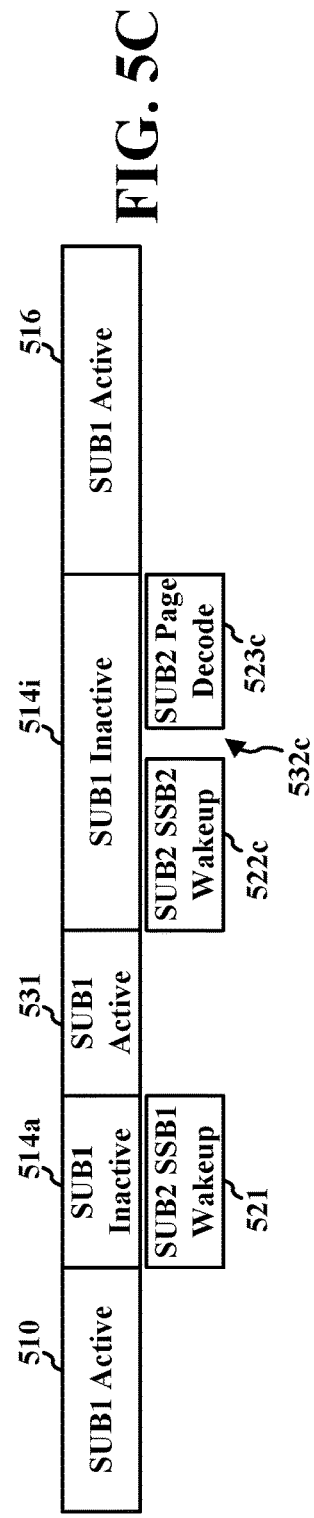
FIG. 5A
FIG. 5B
FIG. 5C

QUICK BURST TUNEAWAY

CROSS REFERENCE TO RELATED APPLICATION(S)

This application claims the benefit of U.S. Provisional Application Ser. No. 62/771,527, entitled "Quick Burst Tuneaway" and filed on Nov. 26, 2018, which is expressly incorporated by reference herein in its entirety.

BACKGROUND

Technical Field

The present disclosure relates generally to communication systems, and more particularly, to a User Equipment (UE) capable of operation on multiple Radio Access Technologies (RATs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A Dual SIM Dual Standby (DSDS) device may operate using more than one Radio Access Technology (RAT) with a single, shared receiver. The device may comprise, e.g., a first subscription (SUB1) for a first RAT and a second subscription (SUB2) for a second RAT. The first RAT may comprise NR/L/W/TDS/DO/1x/G, etc. and the second subscription may be based on NR, for example. When the first subscription SUB1 is in connected mode and the other subscription SUB2 is in an idle mode, e.g., camped on NR wireless communication, the device may need to tune away from SUB1 to monitor for a page using SUB2 and/or to carry out a search, to carry out a measurement, or to read system information. The device may need to wake up in multiple bursts in order to warm up the receiver before actually decoding an NR page. The SSB bursts may be spaced apart in time, e.g., spaced by tens of milliseconds. If the device tunes away from using SUB1 to monitor for multiple SSB bursts using SUB2, data throughput is reduced for SUB1 and may lead to a significant reduction in performance. Aspects presented herein improve data throughput by enabling a device to warm up the receiver for SUB2 in a manner that reduces the impact on data throughput for SUB1.

In an aspect of the disclosure, a method, a computer-readable medium, and an apparatus are provided. The apparatus may be a UE having a first subscription to a first RAT and a second subscription to a second RAT. The apparatus may be configured to operate using the first RAT, to change from operating using the first RAT to operating using the second RAT to monitor multiple SSBs at multiple times prior to performing at least one of decoding a paging message, receiving system information, searching a neighboring frequency, or measuring the neighboring frequency, to return to using the first RAT during a first period between at least one set of adjacent times of the multiple times that the UE monitors for the SSBs, and to change from using the first RAT to using the second RAT to receive the paging message, receive the system information, search the neighboring frequency, or measure the neighboring frequency.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A is a diagram illustrating the active status of a UE on first and second RATs.

FIG. 5B is a diagram illustrating the active status of a UE on first and second RATs returning to operation of the first RAT between operations on the second RAT.

FIG. 5C is a diagram illustrating the active status of a UE on first and second RATs combining bursts.

DETAILED DESCRIPTION

Figure 1:
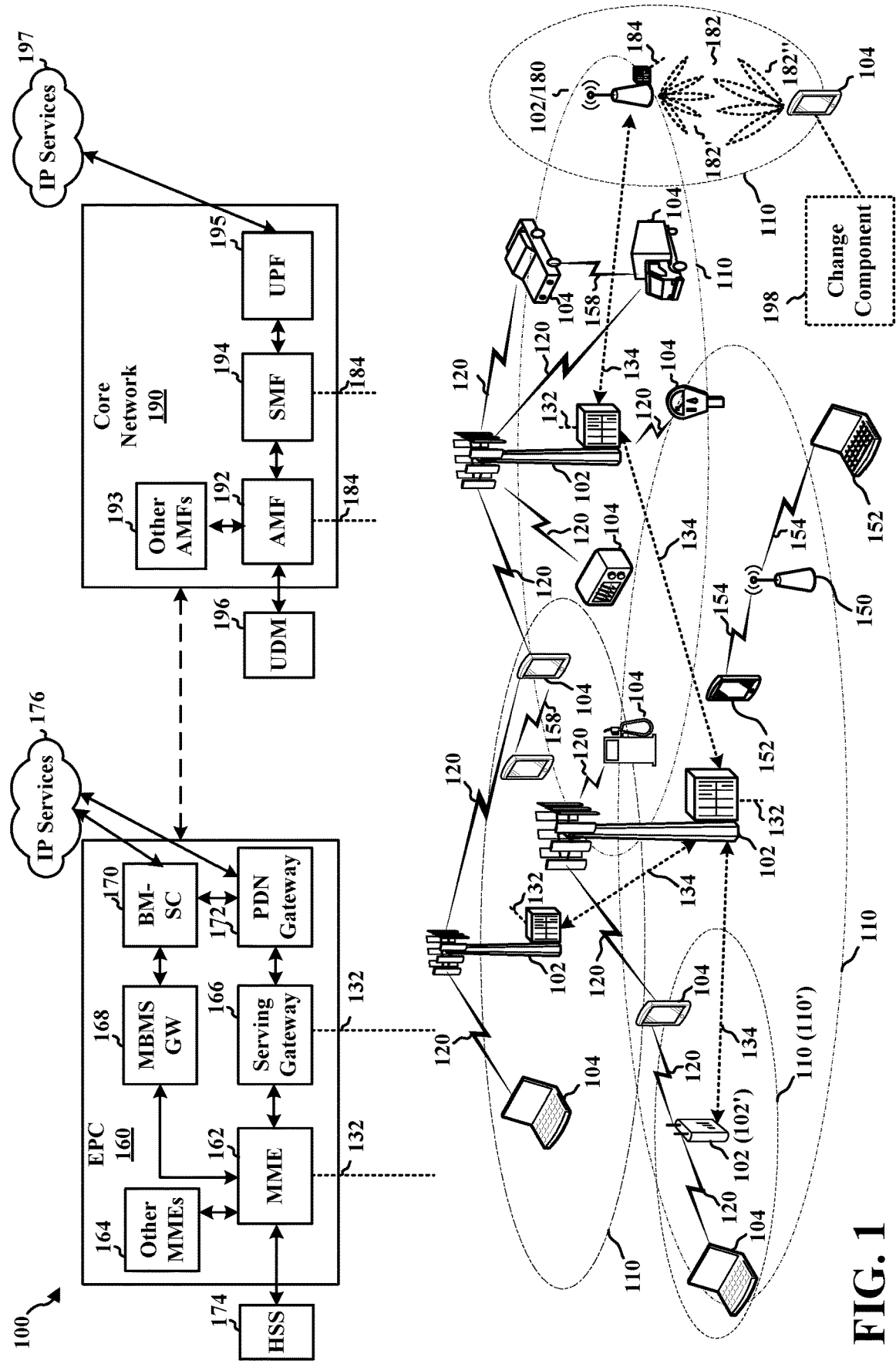
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may have a first subscription to a first RAT and a second subscription to a second RAT. The UE 104 may be configured to operate using the first RAT, and may comprise a change component 198 configured to change from operating using the first RAT to operating using the second RAT multiple times to monitor multiple SSBs prior to performing at least one of decoding a paging message, receiving system information, searching a neighboring frequency, or measuring the neighboring frequency, to return to using the first RAT during a first period between at least one set of adjacent times that the UE monitors for the SSBs; and to change from using the first RAT to using the second RAT to receive the paging message, receive the system information, search the neighboring frequency, or measure the neighboring frequency.

Figure 2:
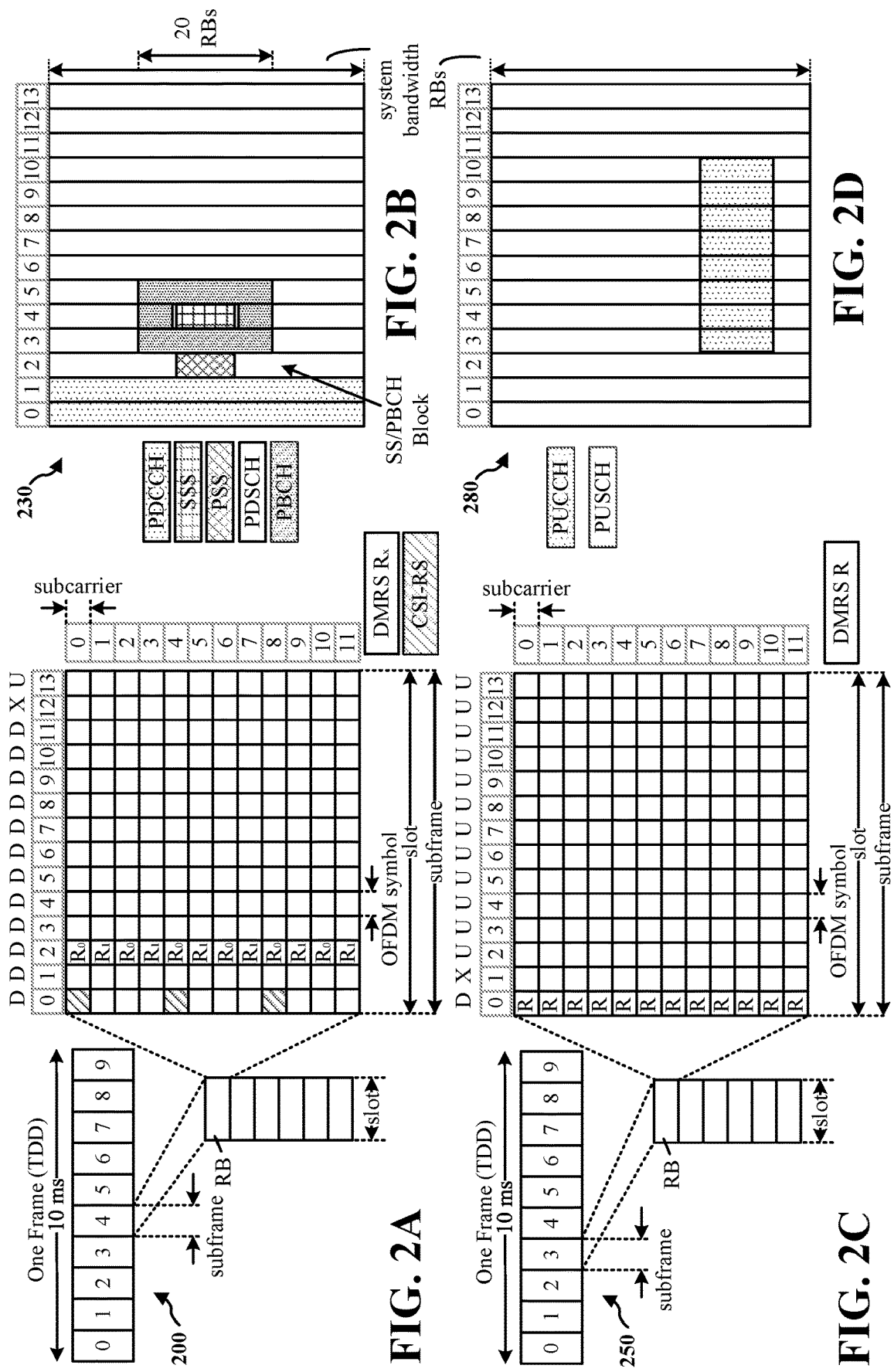
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
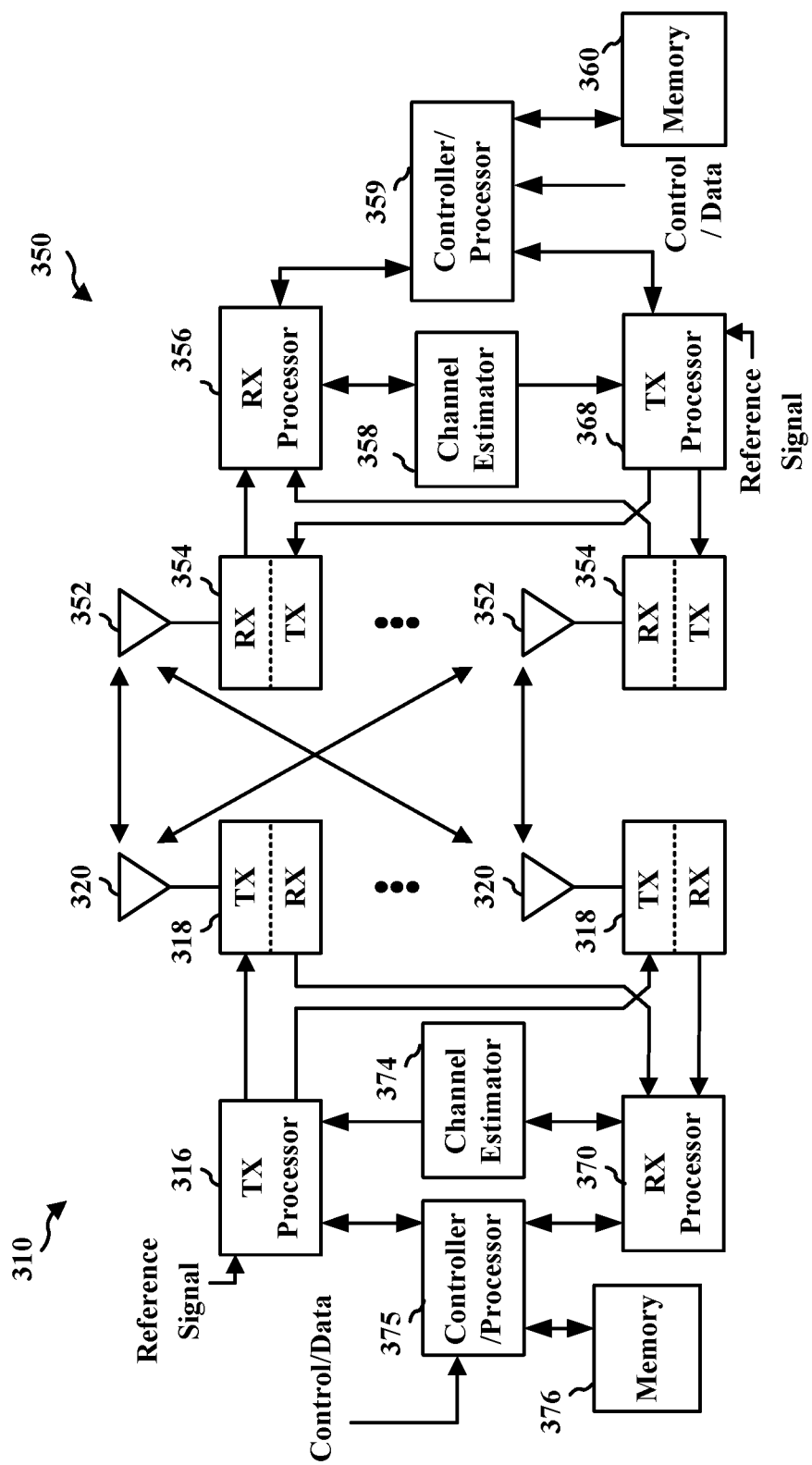
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
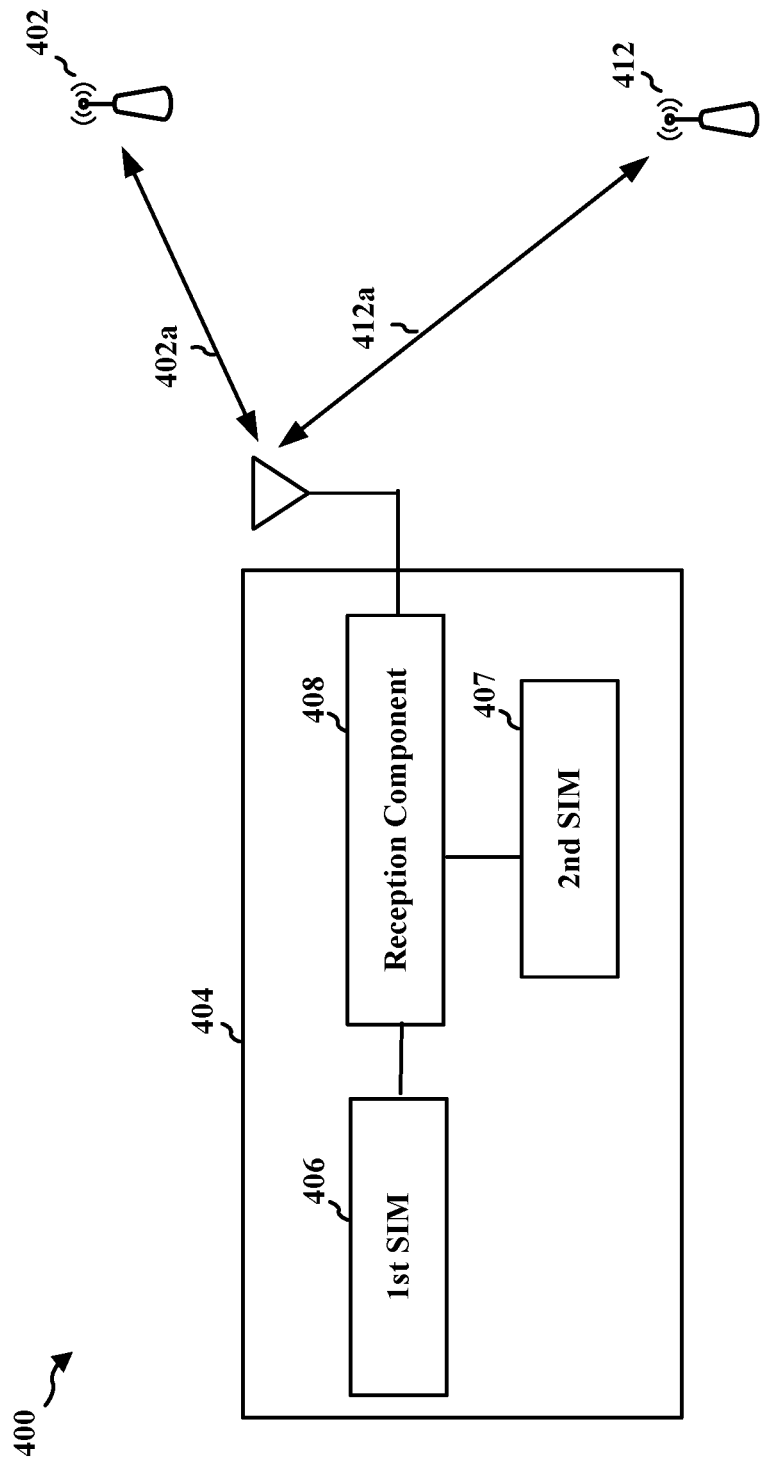
FIG. 4 is a diagram illustrating a UE with two subscriber identity module (SIM) cards for two RATs that share a reception component/antenna.

FIG. 4 is a diagram 400 illustrating a UE 402 with multiple SIM cards 406, 407 that provide subscriptions for different RATs that share a reception component/antenna. Although only two SIM cards are illustrated, the UE may comprise more than two SIM cards that share transceiver components. The UE may be a device in wireless communication network. For example, the UE 404 may include a Dual SIM device that is capable of operating operation modes using the two RATs that share a single receiver, such as using Dual SIM Dual Standby. A Dual SIM Dual Standby device may allow a user to put multiple active SIMs into a single device and to operate sharing transceiver components. By having SIM cards, the single device can work with multiple carriers and networks to provide enhanced communication coverage for the user.

As shown in FIG. 4, the UE 404 may include a first SIM card 406 and a second SIM card 407. The first SIM card 406 may provide the UE 404 with a first subscription for communication 402a with a base station 402 using a first RAT, and the second SIM card 407 may provide the UE with a second subscription for communication 412a with a base station 412 using a second RAT. For example, the first RAT may comprise LTE wireless communication, and the second RAT may comprise NR wireless communication and/or mmW based communication. For example, the UE may be in connected mode for the first SIM 406 and in an idle mode for the second SIM 407, e.g., camped on NR communication network. The UE 404 may operate using the first RAT to transmit and/or receive communication 402a from the first base station 402. The UE may be tuned away from using the first RAT to operate using the second RAT to monitor for a page, or carry out searches/measurements, or read system information, e.g., from base station 412. For example, the UE may need to warm up the reception component 408 (e.g., a receiver) by monitoring for multiple SSB bursts using the second RAT before receiving and decoding a page. Thus, warming up the reception component 408 may including using the reception component 408 to monitor for multiple SSB bursts in preparation for receiving a page, performing a measurement, etc. Thus, the UE 404 may need to change from operating using the first RAT to operating using the second RAT multiple times, e.g., to monitor for multiple SSBs, in preparation for performing an action using the second RAT. The action may comprise decoding a paging message, receiving system information, searching a neighboring frequency, and/or measuring the neighboring frequency, etc.

FIG. 5A is a diagram 500a illustrating the active status of a UE on first and second RATs. The UE may experience reduced data throughput for the first RAT when a UE changes from using the first RAT to using the second RAT. For example, the UE may be the UE 404 of FIG. 4. FIG. 5A illustrates that the UE may tune away from the first RAT for a combined period of time in order to receive multiple SSB bursts to warm up the reception component to receive and decode a page using the second RAT. At 510, the UE may operate using the first RAT. The operation may be in a connected mode, and the UE may receive and/or transmit communication to base station 402 using the first RAT. The UE may stop operating using the first RAT (e.g., may set the first subscription SUB1 inactive) operate using the second RAT at multiple times 521, 522 to monitor for (and, e.g., receive) multiple SSBs from base station 412 prior to performing an action. The multiple instances of monitoring the SSB bursts using the second RAT may be used to prepare the reception component to perform the action. The action may include any of decoding a paging message, receiving system information, searching a neighboring frequency, and/or measuring the neighboring frequency, etc. Further, the UE may operate using the second RAT during a time period 523 to actually perform the action, e.g., decoding the paging message, receiving the system information, searching the neighboring frequency, and/or measuring the neighboring frequency.

Thus, the UE may be using the second RAT for multiple bursts 521, 522 and 523 (e.g., time periods or brief time periods) separated in time in order to warm up the receiver before actually decoding the information and to perform decoding the information. For example, as illustrated in FIG. 5A, the UE may be using the second RAT during a first burst 521 to monitor for a first SSB, to be using the second RAT during a second burst 522 to monitor for a second SSB, and to be using the second RAT during a third burst 523 to decode a paging message. The bursts 521, 522 and 523 may be spaced apart in time. As one example, the SSB bursts such as 521 and 522 may be separated by tens of milliseconds. FIG. 5A illustrates that the UE may tune away from operation using the first RAT for a single, combined period 514, between the using the first RAT at 510 and 516, to use the second RAT during all the bursts 521, 522 and 523. During the single, combined gap 514 in operation, the first subscription SUB1 may be inactive, and the UE may not send or receive using the first RAT. The single, combined gap 514 in operation using the first RAT may be very large. This single, combined gap 514 may significantly reduce the UE's performance and degrade impact on data throughput for the first RAT.

FIG. 5B is a diagram 500b illustrating the active status of a UE on first and second RATs returning to operation of the first RAT between operations on the second RAT. In some aspects, a UE may return to using a first RAT during a first period (e.g., 531) between at least one set of adjacent times (e.g., 521, 522) that the UE monitors for the SSBs. For example, in order for the UE to monitor for each SSB burst separately with minimum overhead, the UE may be configured to resume operation using the first RAT (e.g., to return the first subscription SUB1 to an active state) during a first period 531 between the bursts 521 and 522. As illustrated in FIG. 5B, after tuning away from the first RAT to wake up (e.g., set the second subscription SUB2 active) in the first burst 521 to monitor for the first SSB using the second RAT, the UE may return to using the first RAT in the first period 531. The UE may, again, tune away from the first RAT in a second burst 522 to monitor for the second SSB using the second RAT. Further, after the UE wakes up using the second RAT in time period 522 to monitor for the second SSB, the UE may return to using the first RAT in the period 532. The UE may then change to operation using the second RAT during time period 523 to perform an action using the second RAT, such as decoding a page (e.g., a page from the base station 412). The UE may return to using the first RAT during a last period, e.g., 532, between a last time that the UE monitors for the SSB, e.g., 522, and a time period that the UE performs at least one of decoding the paging message, receiving the system information, searching the neighboring frequency, or measuring the neighboring frequency, e.g., 523. Instead of having the single, combined gap 514 in operation using the first RAT as illustrated in FIG. 5A, the UE may have multiple small gaps 514a, 514b and 514c in operation using the first RAT as illustrated in FIG. 5B. The operation described herein may reduce or minimize the overhead (e.g., the overhead of operations using the second RAT), thereby improving the data throughput and improving data performance. Although only two instances of monitoring for the SSBs, e.g., 521, 522, are illustrated prior to the UE decoding a page at 523, the UE may monitor more than two SSBs and the UE may resume operation of the first RAT between some or all of the instances of monitoring for the SSBs. FIG. 5B merely illustrates the principle of returning to operation using the first RAT between warm up periods for the second RAT.

As an example, the UE may return to using the first RAT during each period (e.g., 531, 532, etc.) between the multiple times (e.g., 521, 522, 523, etc.) that the UE monitors for the SSBs and/or performs the decoding, as illustrated in FIG. 5B. Thus, the UE may have multiple small gaps 514a, 514b and 514c, and eliminate the single large gap 514 that may degrade the data performance and reduce the data throughput for the first RAT.

FIG. 5C is a diagram 500c illustrating the active status of a UE on first and second RATs combining bursts. The UE may also have the flexibility to combine two bursts that are close to each other (e.g., too close to each other). Although the example in FIG. 5B illustrates the SSB monitoring periods 521, 522, 523 having similar spacing in time, the UE may also monitor for SSBs using different time spacing between SSBs. The UE may determine whether or not to return to using the first RAT between instances of monitoring for an SSB and/or performing another action using the SSB based on the amount of time between the instances of monitoring for the SSBs. For example, the UE may be configured to continue to operate using the second RAT during a last period 532c between a last time 522c that the UE monitors for a SSB and a time period 523c that the UE performs at least one of decoding the paging message, receiving the system information, searching the neighboring frequency, or measuring the neighboring frequency, if the length of the last period 532c is less than a threshold. For example, as illustrated in FIG. 5C, when the bursts 522c and 523c are very close to each other, the period 532c between the bursts 522c and 523c may be too small for the UE to return to the first RAT. Accordingly, the threshold may be the amount of time the UE takes to switch from operating on the second RAT to operating on the first RAT, may be the amount of time the UE takes to switch from operating on the second RAT to operating on the first RAT then back to operating on the second rat, or may be either of those amounts of times plus a buffer. The time 532c between 522c and 523c may not provide a meaningful amount of time for the UE to receive/transmit using the first RAT. Accordingly, the threshold may be the amount of time the UE takes to perform a receive or transmit operating using the first RAT or the amount of time the UE takes to perform a meaningful number of receive or transmit operations. As well, the combined time 514i during which the UE tunes away from the first RAT may be short relative to the single, combined time 514 because the gap 532c is small. In some aspects, the threshold size that the UE uses to determine whether or not to return to use of the first RAT may be UE specific, e.g., the threshold may be based on a modem processing capability of the UE. Depending on the modem processing capabilities of the UE, the UE may combine the bursts 522c and 523c, and use a combined gap 514i.

For another example, the UE may be configured to continue to operate using the second RAT, during a period (not shown) between at least one set of adjacent times that the UE monitors for the SSBs, if the period is less than a threshold amount of time. For example, SSBs may be separated by 10 ms, 20 ms, etc. In some aspects, such as aspects where a period between SSB bursts and/or the time for performing the action such as decoding the page or performing other measurements is a few milliseconds, the UE may determine to remain operating using the second RAT for a combined amount of time. For example, if the gap is only 2 or 3 ms, the UE may determine to use the second RAT during a combined period.

Figure 6:
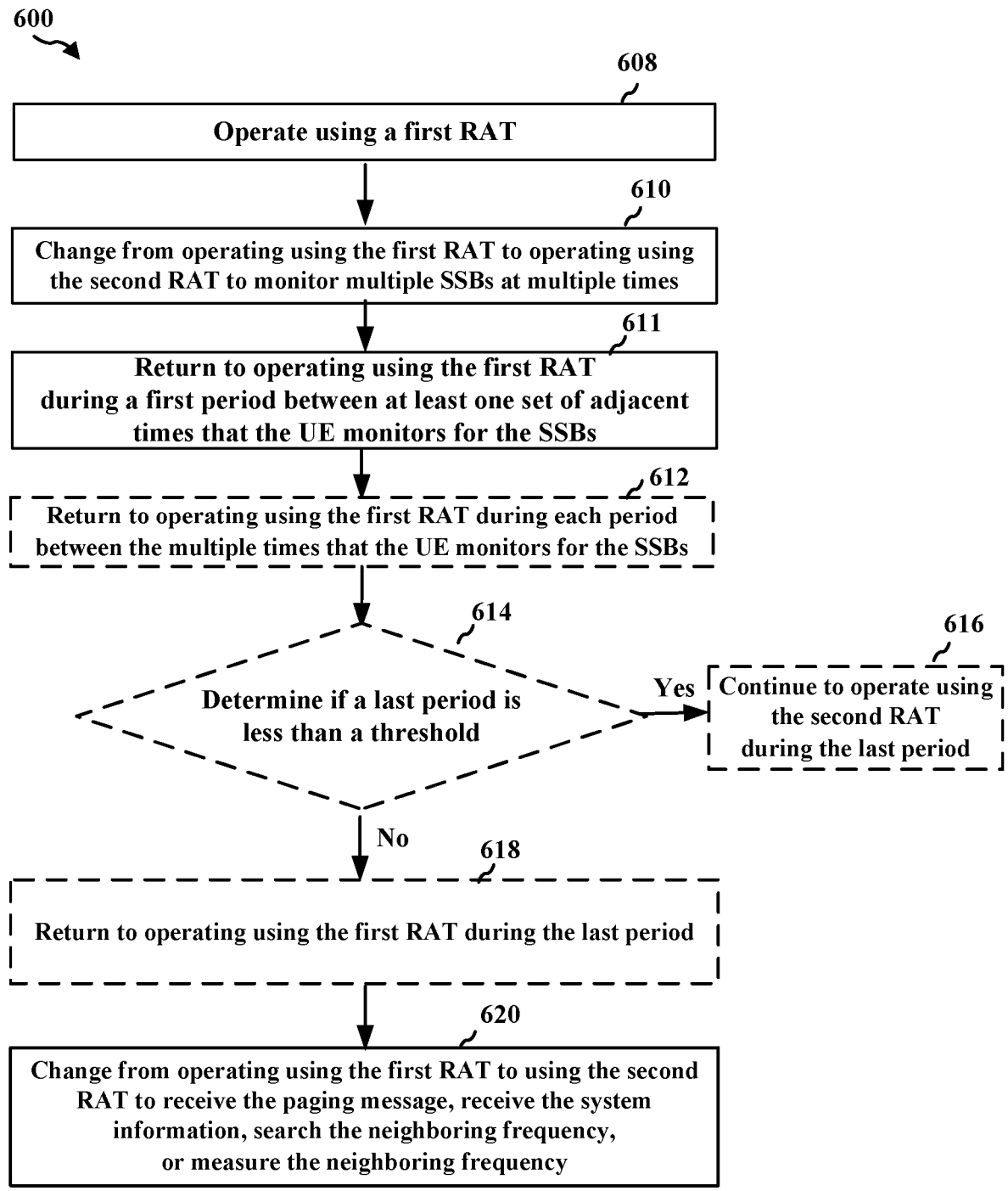
FIG. 6 is a flowchart of a method of wireless communication.

FIG. 6 is a flowchart 600 of a method of wireless communication at a device. The method may be performed, for example, by a Dual SIM device, e.g., a UE (e.g., UE 104, 404, the apparatus 702/702', the processing system 814, which may include the memory 360 and which may be the entire UE 104 or a component of the UE 104, such as the TX processor 368, the RX processor 356, and/or the controller/processor 359) having a first subscription to a first RAT and a second subscription to a second RAT in a wireless communication network. The device may comprise multiple SIM cards as described in connection with FIG. 4. The wireless communication may comprise LTE, and/or 5G/NR communication. To facilitate an understanding of the techniques and concepts described herein, the method of flowchart 600 may be discussed with reference to the examples illustrated in FIGS. 4 and 5. Optional aspects may be illustrated in dashed lines. The method may enable the device to operate using multiple subscriptions to different RATs, e.g., based on multiple SIM cards, using a shared receiver in a manner that reduces the impact on data throughput and device performance.

At 608, the UE may operate using the first RAT. For example, 608 may be performed by the first subscription component 708 from FIG. 7. For example, the device may operate in a connected mode for the first RAT, e.g., receiving and/or transmitting communication using the first RAT. As one example, the first RAT may be LTE wireless communication.

At 610, the UE may change from operating using the first RAT to operating using the second RAT to monitor multiple SSBs at multiple times prior to performing at least one of decoding a paging message, receiving system information, searching a neighboring frequency, or measuring the neighboring frequency. For example, 610 may be performed by the change component 712 and the second subscription component 710 from FIG. 7. The operation using the second RAT may comprise monitoring for SSBs that may be sent by a base station using the second RAT. Thus, the operation of the UE using the second RAT might not involve the transmission or reception of communication using the second RAT, but may involve merely monitoring for SSBs that may be received using the second RAT. For example, the second RAT may be 5G NR wireless communication. The UE may change from operating using the first RAT to operating using the second RAT, e.g., to warm up the receiver in order to decode a page using the second RAT, as described in connection with FIGS. 5B-5C, etc. For example, a device may be configured with one subscription for the first RAT and a second subscription for the second RAT. A data call may be set up on the first RAT, and the UE may be camped in an idle state for the second RAT. The UE may suspend and resume activity using the first RAT in order to monitor for SSBs that may be received via the second RAT. The UE may tune away from the data subscription on the first RAT to monitor for the SSBs.

At 611, the UE may return to operating using the first RAT during a first period between at least one set of adjacent times of the multiple times that the UE monitors for the SSBs, e.g., as illustrated in FIG. 5B. For example, 611 may be performed by the change component 712 and the first subscription component 708 from FIG. 7. In some aspects, the UE may return to operating using the first RAT during a last period between a last time that the UE monitors for the SSB and a time period that the UE performs the at least one of decoding the paging message, receiving the system information, searching the neighboring frequency, or measuring the neighboring frequency, e.g., as illustrated in FIG. 5C.

At 612, in some aspects, the UE may return to operating using the first RAT during each period between the multiple times that the UE monitors for the SSBs in preparation to perform the at least one of decoding the paging message, receiving the system information, searching the neighboring frequency, or measuring the neighboring frequency, e.g., as illustrated in FIG. 5B. For example, 612 may be performed by the change component 712 and the first subscription component 708 from FIG. 7.

At 614, in some aspects, the UE may determine if the last period is less than a threshold. For example, 614 may be performed by the change component 712 from FIG. 7. The UE may perform this determination in order to determine whether or not to return to operating using the first RAT during the period. If the period is small (e.g., below a threshold), the UE may determine not to return to operation using the first RAT. If the period is at least a threshold size, the UE may determine to return to operation using the first RAT.

For example, at 616, the UE may continue to operate using the second RAT during the last period between the last time that the UE monitors for the SSB and a time period that the UE performs the at least one of decoding the paging message, receiving the system information, searching the neighboring frequency, or measuring the neighboring frequency, if the last period is less than a threshold. For example, 616 may be performed by the second subscription component 710 from FIG. 7. In some aspects, the threshold is UE specific. In some aspects, the threshold is based on a modem processing capability of the UE, e.g., as illustrated in the example in FIG. 5C.

At 618, the UE may return to operating using the first RAT during the last period between the last time that the UE monitors for the SSB and the time period that the UE performs the at least one of decoding the paging message, receiving the system information, searching the neighboring frequency, or measuring the neighboring frequency, if the period is not less than the threshold. For example, 618 may be performed by the change component 712 and the first subscription component 708 from FIG. 7.

In some aspects, the UE may continue to operate using the second RAT during a period between at least one set of adjacent times that the UE monitors for the SSBs, if the period is less than a threshold. On the other hand, the UE may return to operating using the first RAT during a period between at least one set of adjacent times that the UE monitors for the SSBs, if the period is not less than the threshold. If the gap between adjacent times is small, the device may not gain much benefit from returning to the first RAT.

At 620, the UE may change from operating using the first RAT to using the second RAT to receive the paging message, receive the system information, search the neighboring frequency, or measure the neighboring frequency. For example, 620 may be performed by the change component 712, the second subscription component 710, and the decoding/measuring/searching component 714 from FIG. 7. Thus, the method may further comprise, receiving the paging message using the second RAT, reception of system information using the second RAT, searching the neighbor frequency using the second RAT, and/or measuring the neighboring frequency using the second RAT. For example, the device may receive and decode an SSB using the second RAT following a warm up of the receiver.

Figure 7:
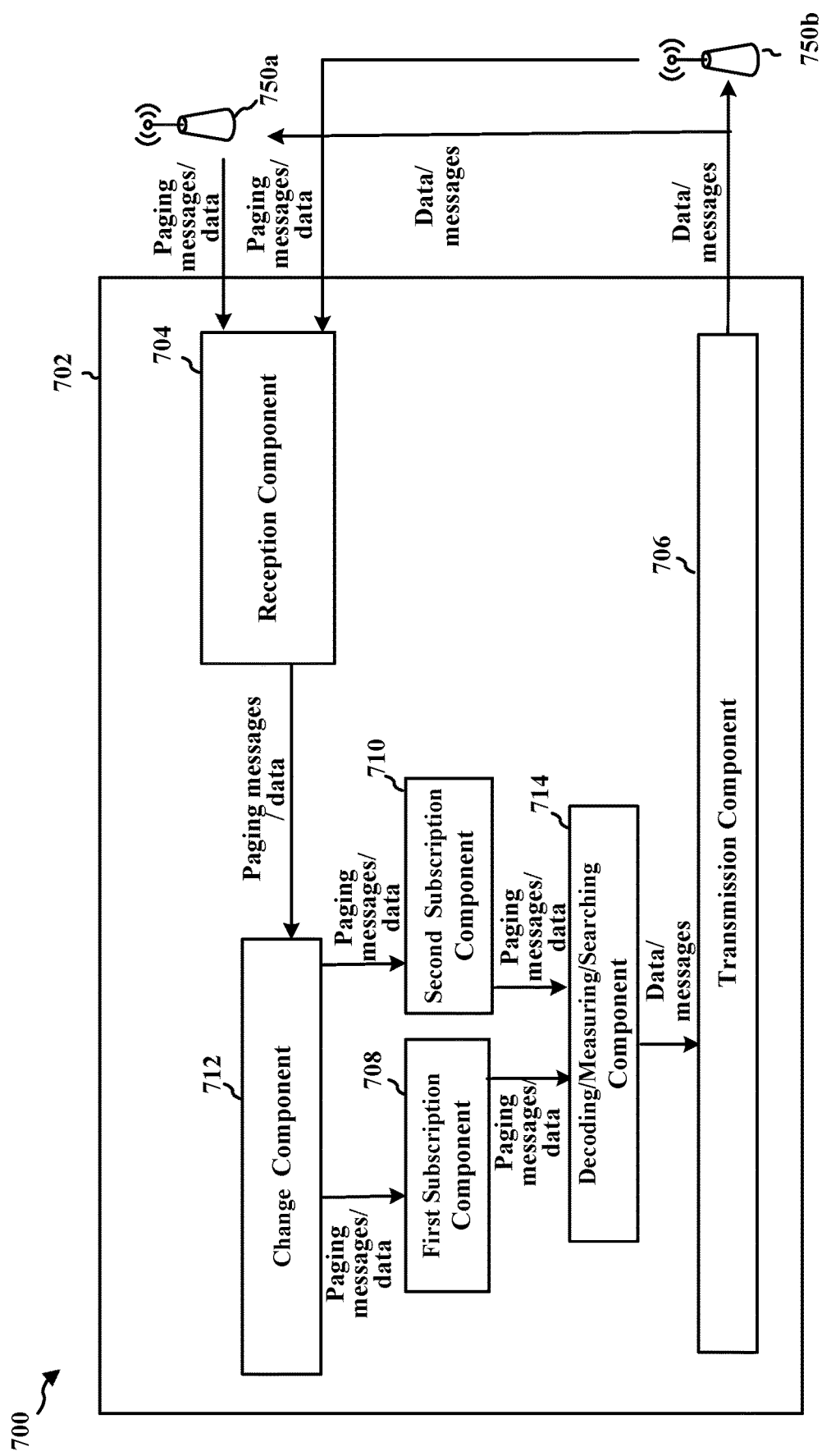
FIG. 7 is a conceptual data flow diagram illustrating the data flow between different means/components in an exemplary apparatus.

FIG. 7 is a conceptual data flow diagram 700 illustrating the data flow between different means/components in an example apparatus 702. The apparatus may be a Dual SIM device, e.g., a UE (e.g., UE 104', 404, the apparatus 702/702', etc.) having a first subscription to a first RAT 750a and a second subscription to a second RAT 750b in a wireless communication. The wireless communication may comprise an LTE and/or 5G NR communication, as described herein.

The apparatus includes a reception component 704 for receiving data/messages from the first RAT and/or the second RAT. For example, the reception component 704 may receive a paging message, system information, information that enables the apparatus to search the neighboring frequency or measure the neighboring frequency, an SSB, etc.

The apparatus includes a transmission component 706 for transmitting data/message to base stations 750a, 750b using the first RAT and/or the second RAT. For example, the transmission component 706 may transmit a measurement results or messages or search results.

The apparatus includes a first subscription component 708 for operating using a first RAT, e.g., in receiving and/or transmitting communication with base station 750a, e.g., as described in connection with 608, 611, 612, and 618. For example, the first subscription component 708 may comprise a first SIM card. The apparatus further includes a second subscription component 710 for operating a second RAT, e.g., in receiving and/or transmitting communication with base station 750b, e.g., as described in connection with 610, 616, and 620. For example, the second subscription component 710 may comprise a second SIM card. For example, the apparatus may be a DUAL SIM device. Although this example is described for two RATs, the device may comprise subscriptions, e.g., SIM cards, for more than two RATs.

The apparatus includes a Change component 712 for changing from operating using the first RAT to communicate with base station 750a to operating using the second RAT to communicate with base station 750b, and for returning to operating using the first RAT to communicate with base station 750a, e.g., as described in connection with 610, 611, 612, 614, 618, and 620. For example, the apparatus may change from operating using the first RAT to communicate with base station 750a to operating using the second RAT to monitor for communication from base station 750b to monitor multiple SSBs at multiple times prior to performing at least one of decoding a paging message, receiving system information, searching a neighboring frequency, or measuring the neighboring frequency.

The apparatus includes a Decoding/Measuring/Searching component 714 for performing decoding a paging message, searching a neighboring frequency, measuring the neighboring frequency, or other tasks, e.g., as described in connection with 620.

The apparatus may include additional components that perform each of the blocks of the algorithm in the aforementioned flowcharts of FIGS. 4-6. As such, each block in the aforementioned flowcharts of FIGS. 4-6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
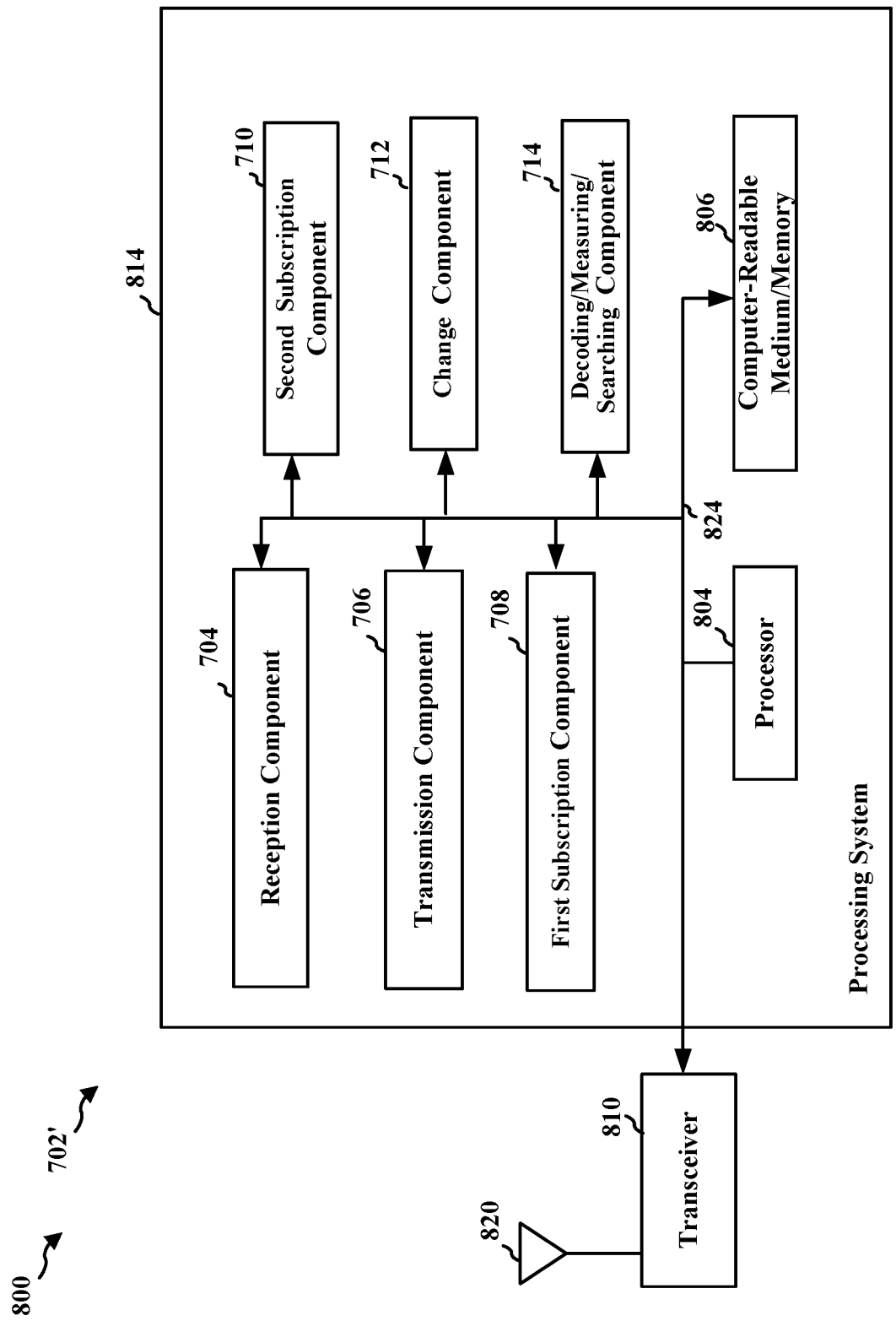
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 706, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714. The components may be software components running in the processor 804, resident/stored in the computer readable medium/memory 806, one or more hardware components coupled to the processor 804, or some combination thereof. In one configuration, the processing system 814 may be a component of a UE, e.g., device 350, and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for operating using the first RAT; means for changing from operating using the first RAT to operating using the second RAT multiple times to monitor multiple SSBs prior to performing at least one of decoding a paging message, receiving system information, searching a neighboring frequency, or measuring the neighboring frequency; means for returning to using the first RAT during a first period between at least one set of adjacent times that the UE monitors for the SSBs; and means for changing from using the first RAT to using the second RAT to receive the paging message, receive the system information, search the neighboring frequency, or measure the neighboring frequency. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE) having a first subscription to a first Radio Access Technology (RAT) and a second subscription to a second RAT, the method comprising:
   operating using the first RAT;
   changing from operating using the first RAT to operating using the second RAT to monitor for multiple Synchronization Signal Blocks (SSBs) at multiple times prior to performing at least one of decoding a paging message, receiving system information, searching a neighboring frequency, or measuring the neighboring frequency;
   returning to operating using the first RAT during a first period between at least one set of adjacent times of the multiple times that the UE monitors for the SSBs; and
   changing from operating using the first RAT to operating using the second RAT to receive the paging message, receive the system information, search the neighboring frequency, or measure the neighboring frequency.

2. The method of claim 1, wherein the UE returns to operating using the first RAT during each period between the multiple times that the UE monitors for the SSBs in preparation to perform the at least one of decoding the paging message, receiving the system information, searching the neighboring frequency, or measuring the neighboring frequency.

3. The method of claim 1, wherein the UE continues to operate using the second RAT during a last period between a last time that the UE monitors for the SSB and a time period that the UE performs the at least one of decoding the paging message, receiving the system information, searching the neighboring frequency, or measuring the neighboring frequency, if the last period is less than a threshold.

4. The method of claim 3, wherein the UE returns to operating using the first RAT between the last time that the UE monitors for the SSB and the time period that the UE performs the at least one of decoding the paging message, receiving the system information, searching the neighboring frequency, or measuring the neighboring frequency, if the last period is not less than the threshold.

5. The method of claim 3, wherein the threshold is UE specific.

6. The method of claim 3, wherein the threshold is based on a modem processing capability of the UE.

7. The method of claim 1, wherein the UE operates using the first RAT in a connected mode.

8. The method of claim 1, wherein the first subscription is based on a first Subscriber Identity Module (SIM) for the first RAT and the second subscription is based on a second SIM for the second RAT.

9. The method of claim 1, further comprising
   returning to operating using the first RAT during a last period between a last time that the UE monitors for the SSB and a time period that the UE performs the at least one of decoding the paging message, receiving the system information, searching the neighboring frequency, or measuring the neighboring frequency.

10. The method of claim 1, wherein the operating using the second RAT comprises monitoring for at least one SSB.

11. An apparatus for wireless communication at a User Equipment (UE) having a first subscription to a first Radio Access Technology (RAT) and a second subscription to a second RAT, the apparatus comprising:
    means for operating using the first RAT;
    means for changing from operating using the first RAT to operating using the second RAT to monitor multiple Synchronization Signal Blocks (SSBs) at multiple times prior to performing at least one of decoding a paging message, receiving system information, searching a neighboring frequency, or measuring the neighboring frequency,
    wherein the means for changing are further configured to return to operating using the first RAT during a first period between at least one set of adjacent times of the multiple times that the UE monitors for the SSBs and
    change from operating using the first RAT to operating using the second RAT to receive the paging message, receive the system information, search the neighboring frequency, or measure the neighboring frequency.

12. The apparatus of claim 11, wherein the UE returns to operating using the first RAT during each period between the multiple times that the UE monitors for the SSBs in preparation to perform the at least one of decoding the paging message, receiving the system information, searching the neighboring frequency, or measuring the neighboring frequency.

13. The apparatus of claim 11, wherein the UE continues to operate using the second RAT during a last period between a last time that the UE monitors for the SSB and a time period that the UE performs the at least one of decoding the paging message, receiving the system information, searching the neighboring frequency, or measuring the neighboring frequency, if the last period is less than a threshold.

14. The apparatus of claim 13, wherein the UE returns to operating using the first RAT between the last time that the UE monitors for the SSB and the time period that the UE performs the at least one of decoding the paging message, receiving the system information, searching the neighboring frequency, or measuring the neighboring frequency, if the last period is not less than the threshold.

15. The apparatus of claim 13, wherein the threshold is UE specific.

16. The apparatus of claim 13, wherein the threshold is based on a modem processing capability of the UE.

17. The apparatus of claim 11, wherein the UE operates using the first RAT in a connected mode.

18. The apparatus of claim 11, wherein the first subscription is based on a first Subscriber Identity Module (SIM) for the first RAT and the second subscription is based on a second SIM for the second RAT.

19. The apparatus of claim 11, wherein the means for changing are configured to return to operating using the first RAT during a last period between a last time that the UE monitors for the SSB and a time period that the UE performs the at least one of decoding the paging message, receiving the system information, searching the neighboring frequency, or measuring the neighboring frequency.

20. An apparatus for wireless communication at a User Equipment (UE) having a first subscription to a first Radio Access Technology (RAT) and a second subscription to a second RAT, comprising:
    a memory; and
    at least one processor coupled to the memory and configured to:
       operate using the first RAT;
       change from operating using the first RAT to operating using the second RAT to monitor multiple Synchronization Signal Blocks (SSBs) at multiple times prior to performing at least one of decoding a paging message, receiving system information, searching a neighboring frequency, or measuring the neighboring frequency;

return to operating using the first RAT during a first period between at least one set of adjacent times of the multiple times that the UE monitors for the SSBs; and change from operating using the first RAT to operating using the second RAT to receive the paging message, receive the system information, search the neighboring frequency, or measure the neighboring frequency.

21. The apparatus of claim 20, wherein the UE returns to operating using the first RAT during each period between the multiple times that the UE monitors for the SSBs in preparation to perform the at least one of decoding the paging message, receiving the system information, searching the neighboring frequency, or measuring the neighboring frequency.

22. The apparatus of claim 20, wherein the UE continues to operate using the second RAT during a last period between a last time that the UE monitors for the SSB and a time period that the UE performs the at least one of decoding the paging message, receiving the system information, searching the neighboring frequency, or measuring the neighboring frequency, if the last period is less than a threshold.

23. The apparatus of claim 22, wherein the UE returns to operating using the first RAT between the last time that the UE monitors for the SSB and the time period that the UE performs the at least one of decoding the paging message, receiving the system information, searching the neighboring frequency, or measuring the neighboring frequency, if the last period is not less than the threshold.

24. The apparatus of claim 22, wherein the threshold is UE specific.

25. The apparatus of claim 22, wherein the threshold is based on a modem processing capability of the UE.

26. The apparatus of claim 20, wherein the UE operates using the first RAT in a connected mode.

27. The apparatus of claim 20, wherein the first subscription is based on a first Subscriber Identity Module (SIM) for the first RAT and the second subscription is based on a second SIM for the second RAT.

28. The apparatus of claim 20, wherein the at least one processor is further configured to:

return to operating using the first RAT during a last period between a last time that the UE monitors for the SSB and a time period that the UE performs the at least one of decoding the paging message, receiving the system information, searching the neighboring frequency, or measuring the neighboring frequency.

29. A non-transitory computer-readable medium storing computer executable code for wireless communication at a User Equipment (UE) having a first subscription to a first Radio Access Technology (RAT) and a second subscription to a second RAT, the code when executed by a processor cause the processor to:

operate using the first RAT;

change from operating using the first RAT to operating using the second RAT to monitor multiple Synchronization Signal Blocks (SSBs) at multiple times prior to performing at least one of decoding a paging message, receiving system information, searching a neighboring frequency, or measuring the neighboring frequency;

return to operating using the first RAT during a first period between at least one set of adjacent times of the multiple times that the UE monitors for the SSBs; and change from operating using the first RAT to operating using the second RAT to receive the paging message, receive the system information, search the neighboring frequency, or measure the neighboring frequency.

* * * * *